(12) United States Patent
Yoshinaka

(10) Patent No.: US 7,204,283 B2
(45) Date of Patent: Apr. 17, 2007

(54) PNEUMATIC TIRE WITH SPECIFIED BEAD PORTION PROFILE

(75) Inventor: Nobuyoshi Yoshinaka, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 248 days.

(21) Appl. No.: 10/805,217

(22) Filed: Mar. 22, 2004

(65) Prior Publication Data

US 2004/0187995 A1 Sep. 30, 2004

(30) Foreign Application Priority Data

Mar. 31, 2003 (JP) ............................. 2003-095481

(51) Int. Cl.
 B60C 3/04 (2006.01)
 B60C 3/00 (2006.01)
 B60C 15/02 (2006.01)
 B60C 15/024 (2006.01)

(52) U.S. Cl. .................. 152/454; 152/539; 152/544

(58) Field of Classification Search ............ 152/544, 152/539, 454
 See application file for complete search history.

(56) References Cited

U.S. PATENT DOCUMENTS 532,950 A * 1/1895 Erickson ............... 152/544 X
575,783 A * 1/1897 Quimby ................ 152/544 X
2,933,118 A * 4/1960 Waber ..................... 152/544
5,622,576 A   4/1997 Lobb et al.

FOREIGN PATENT DOCUMENTS

EP  0 947 358 A1  10/1999
WO  01/81103 A1   11/2001

* cited by examiner

*Primary Examiner*—Adrienne C. Johnstone
(74) *Attorney, Agent, or Firm*—Birch, Stewart, Kolasch & Birch, LLP

(57) ABSTRACT

A pneumatic tire comprises a pair of bead portions each having a bottom face and an axially outer side face which contact with a bead seat and a flange of a wheel rim, respectively, wherein the axially outer side face comprises a radially outer part for contacting with a radially outermost curved portion of the rim flange; and a radially inner part for contacting with a radially inner flat portion of the rim flange. In a meridian section of the tire, the radially inner part is a substantially straight line, and the radially outer part is (A) a substantially straight line or (B) convex line or (C) a curved concave line having a radius of curvature of not less than 300 mm, and the radially outer part extends radially outwards from the radially outer end of the radially inner part while inclining axially outwards.

9 Claims, 6 Drawing Sheets

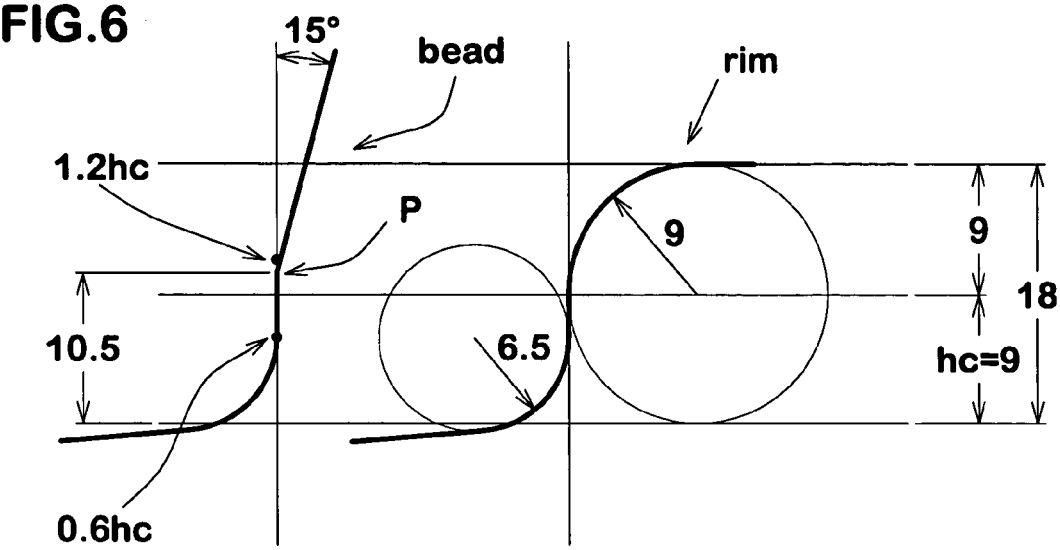
JATMA "7JJ" RIM CONTOUR
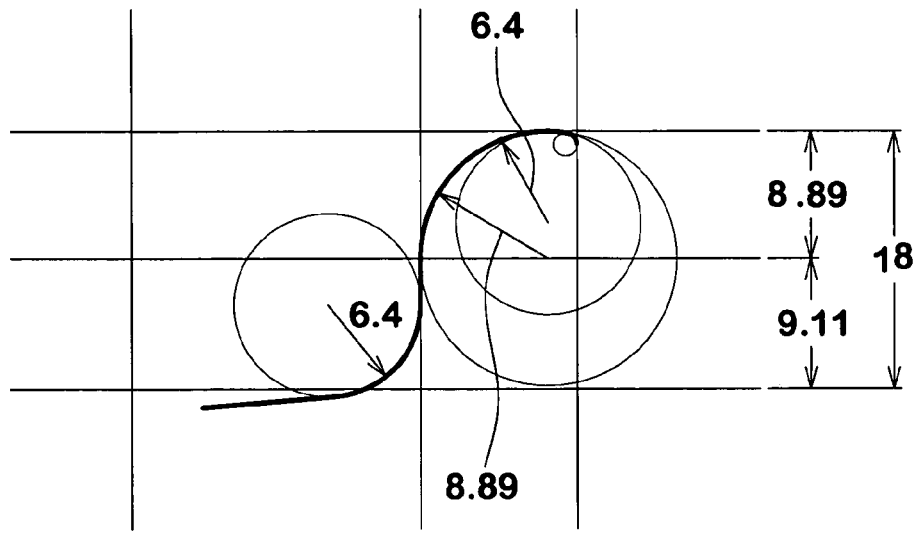
TRA 13-18 RIM DIA. CONTOUR

PNEUMATIC TIRE WITH SPECIFIED BEAD PORTION PROFILE

BACKGROUND OF THE INVENTION

This Non-provisional application claims priority under 35 U.S.C. § 119(a) on Patent Application No. 2003-095481 filed in JAPAN on Mar. 31, 2003, the entire contents of which are hereby incorporated by reference.

The present invention relates to a pneumatic tire, more particularly to a bead structure capable of improving steering stability and ride comfort.

In general, a vehicle wheel rim on which a pneumatic tire is mounted has a counter which is specified according to the tire size and use, by a standardization organization or association in each country or region such as JATMA (Japan and Asia), T&RA (North America), ETRTO (Europe) and STRO (Scandinavia). In case of a passenger car tire for example, as well known in the art, its approved or recommended rim has a bead seat tapered at a small angle and a flange whose radially outer portion is curved axially outwards. Therefore, a pneumatic tire is conventionally designed such that the bead profile fits to such rim contour as shown in FIG. 8. To be concrete, the axially outer side face Sw is formed by a vertical portion 51 and a curved portion S2. The vertical portion S1 is parallel with the tire equatorial plane so as to fit the vertical lower portion of the rim flange Rf. Because the radius of curvature of the curved portion of the rim flanges Rf is about 10 mm (7.5 to 12 mm in JATMA) in case of passenger car tires, the radius of curvature of the curved portion S2 is set to be almost same but slightly larger than that of the rim flange consciously for example set in a range of about 10 to 20 mm so as to accommodate to variation of the flange curvature. Therefore, as shown in FIG. 8, a wedge shaped gap is formed between the curved portions of the bead and rim flange although no gap is formed between the vertical portions of the bead and rim flange.

On the other hand, in case of a very low aspect tire which is nowadays widely used in the high performance passenger cars, sports cars, etc., in order to improve steering stability, usually, the rigidity of the bead portion and lower sidewall portion is increased by increasing the volume of the bead apex rubber (b) and/or providing an additional cord reinforcing layer (c). As a result, because of the small sidewall portion, a portion which can function as a shock absorber is small, and deterioration of ride comfort is inevitable. Further, an increase in rubber volume and addition of cord layer are not always preferable from a point of view of heat buildup and rubber/cord separation.

BRIEF SUMMARY OF THE INVENTION

It is therefore, an object of the present invention to provide a pneumatic tire in which, essentially without increasing rubber volume and providing additional cord layer, steering stability and ride comfort can be improved.

According to the present invention, a pneumatic tire comprises a tread portion, a pair of sidewall portions and a pair of bead portions, each bead portion having a bottom face and an axially outer side face which contact with a bead seat and a flange of a wheel rim, respectively, when the tire is mounted on the wheel rim, in a meridian section of the tire, the axially outer side face comprising a radially inner part for contacting with a radially inner flat portion of the rim flange, and a radially outer part for contacting with a radially outer curved portion of the rim flange, wherein the axially outer side face is provided with a profile such that the radially inner part is a substantially straight line, and the radially outer part is (A) a substantially straight line or (B) a convex line or (c) a curved concave line having a radius of curvature of not less than 300 mm, and the radially outer part extends radially outwards from the radially outer end of the radially inner part while inclining axially outwards.

BRIEF DESCRIPTION OF THE DRAWINGS

Embodiment of the present invention will now be described in detail in conjunction with the accompanying drawings.

FIG. 6 shows the contour of "7JJ" rim specified in JATMA together with the bead profile used in the undermentioned comparison test for Ex.1–Ex.3 tires according to the present invention.

FIG. 7 shows the contour of the corresponding rim specified in T&RA.

DETAILED DESCRIPTION OF THE INVENTION

Figure 1:
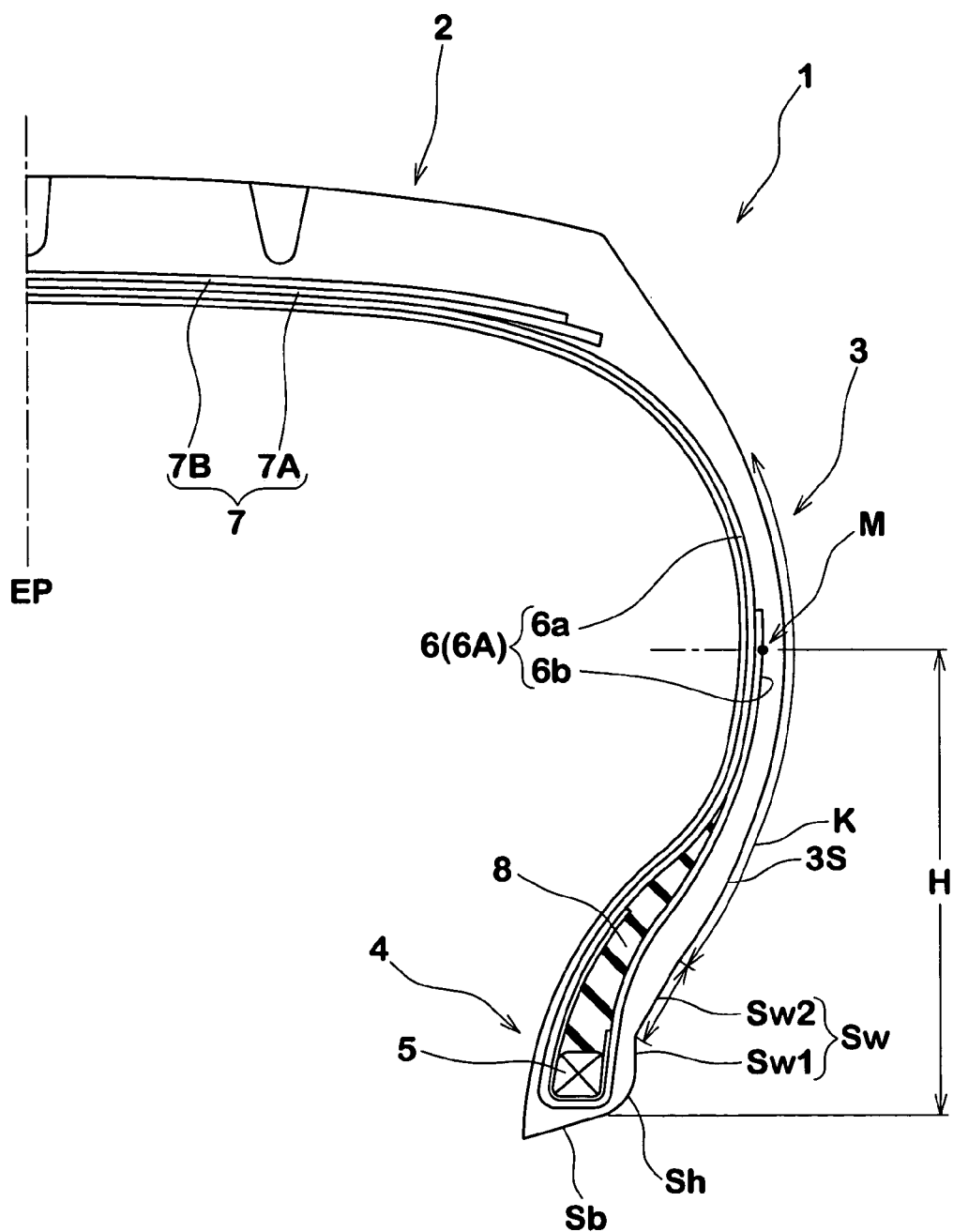
FIG. 1 is a cross sectional view of a pneumatic tire according to the present invention.

Pneumatic tire 1 according to the present invention is usually designed in order to use with a standard wheel rim specified in the above-mentioned JATMA, T&RA, ETRTO, STRO or the like. But, it is of course possible to designed the tire to use in combination with a nonstandardized special rim. In any case, the wheel rim on which the pneumatic tire 1 is mounted comprises a pair of bead seats Rb, a rim well therebetween (not shown) and a pair of flanges Rf. The flange Rf has a radially inner part Rv substantially parallel to the central plane of the rim corresponding to the tire equatorial plane EP, and a radially outer part Rc extending radially outwardly from the radially outer end of the radially inner part Rv while curving axially outwards. The bead seats Rb are tapered at an angle alpha with respect to the axial direction. The bead seat Rb and flange Rf are connected with a curved rim heel portion Rh.

In the drawings, the pneumatic tire 1 comprises a tread portion 2, a pair of sidewall portions 3, a pair of axially spaced bead portions 4 each with a bead core 5 therein, a carcass 6 extending between the bead portions 4, and a belt 7 disposed radially outside the carcass 6 in the tread portion 2.

In this embodiment, the tire 1 has a low aspect ratio of not more than 55%, and a tire size for passenger cars for example 215/40R17, namely, the tire is a low aspect radial tire to be mounted on a five-degree taper drop center rim. Thus, the taper angle alpha of the bead seats Rb is about 5 degrees with respect to the axial direction in this case.

Incidentally, the undermentioned various heights are measured radially from the bead base line BL which is a line passing at the radial position corresponding to the bead diameter or rim diameter D unless otherwise stated.

The above-mentioned belt 7 which is disposed to reinforce the tread portion 2 comprises at least two cross breaker plies 7A and 7B of high modulus cords laid at an angle of from 10 to 35 degrees with respect to the tire equator and optionally a band ply of cords wound radially outside the breaker plies at a substantially zero degree.

In this example, the belt 7 consists of the two cross breaker plies 7A and 7B.

For the high modulus breaker ply cords, steel cords and/or high modulus organic fiber cords such as aromatic polyamide fiber cords can be used.

The carcass 6 comprises at least one ply 6A of cords arranged radially at an angle of 90 to 75 degrees with respect to the tire equator EP, and extending between the bead portions 4 through the tread portion 2 and sidewall portions 3, and turned up around the bead core 5 in each bead portion 4 from the inside to the outside of the tire so as to form a pair of turned up portions 6b and a main portion 6a therebetween.

In this example, the carcass 6 is composed of a single ply 6A of cords arranged radially at substantially 90 degrees.

For the carcass cords, organic fiber cords, e.g. polyester, nylon, rayon and the like can be suitably used.

Between the main portion 6a and turned up portion 6b in each bead portion 4, a bead apex 8 made of a hard rubber is disposed. The bead apex 8 extends radially outwardly from the radially outside of the bead core 5 beyond the height of the rim flange Rf, while tapering towards its radially outer end. The turned up portion 6b in this example extends beyond the radially outer end of the bead apex 8, and then it further extends along the axially outer surface of the main portion 6a up to a position near and slightly radially outside the maximum cross sectional width point M of the carcass 6 under the normally inflated unloaded condition of the tire.

The bead portion 4 has a bottom face Sb, an axially outer side face Sw and a curved bead heel face Sh which connects the two faces Sb and Sw and merges thereinto. The axially outer side face Sw comprises a radially inner part Sw1 and a radially outer part Sw2.

In a condition such that the tire is not mounted on a wheel rim but the bead width Wa is adjusted to the rim width Wr (thus not inflated), the bead bottom face Sb is tapered at an angle which is almost same as the above-mentioned taper angle alpha of the bead seat Rb. This angle may be larger than the angle alpha by a small value of 1 to 3 degrees. The radially inner part Sw1 is substantially parallel with the tire equatorial plane EP. The radially outer part Sw2 extends radially outwardly from the radially outer end of the radially inner part Sw1 while inclining axially outwards. The radially outer part Sw2 can be straight or slightly curved convex or concave line in the tire meridian section.

In case of the slightly curved concave line, the radius of curvature thereof is set in the range of not less than 300 mm, preferably not less than 500 mm, more preferably not less than 800 mm. Here, the radius of 300 mm corresponds to about 30 times the above-mentioned radius of curvature of the radially outer curved portion Rc of the rim flange.

In case of the slightly curved convex line, the radius of curvature thereof may be less than 300 mm unlike the concave line, but in view of resistance to abrasion and durability, it will be desirable to limit this radius also in the same way as in the concave line, namely very large in comparison with the radius of curvature of the rim flange.

The height ha of the radially inner end of the radially outer part Sw2 is set in the range of more than 0.6 times preferably more than 0.8 times but not more than 1.2 times a height hc. The height hc is a height at which the radially outer curved portion Rc of the rim flange Rf meets the radially inner vertical portion Rv of the rim flange. In case of passenger car tires, the height hc is about 9 or 10 mm.

The height hb of the radially outer end of the radially outer part Sw2 is set to be more than the height of the rim flange Rf. In case of passenger car tires or the like, the rim flange height is about 14–22 mm.

The inclination angle theta of the radially outer part Sw2 is set to be at least 5 degrees, preferably, in the range of from 10 to 20 degrees with respect to the tire equatorial plane EP. In case of the slightly curved line, the angle theta is considered to be the intersecting angle between the inner part Sw1 and outer part Sw2. In other words, an inflection P is formed therebetween in any case.

In this example, the radially outer part Sw2 is straight and the inclination angle theta is 15 degrees.

Figure 2:
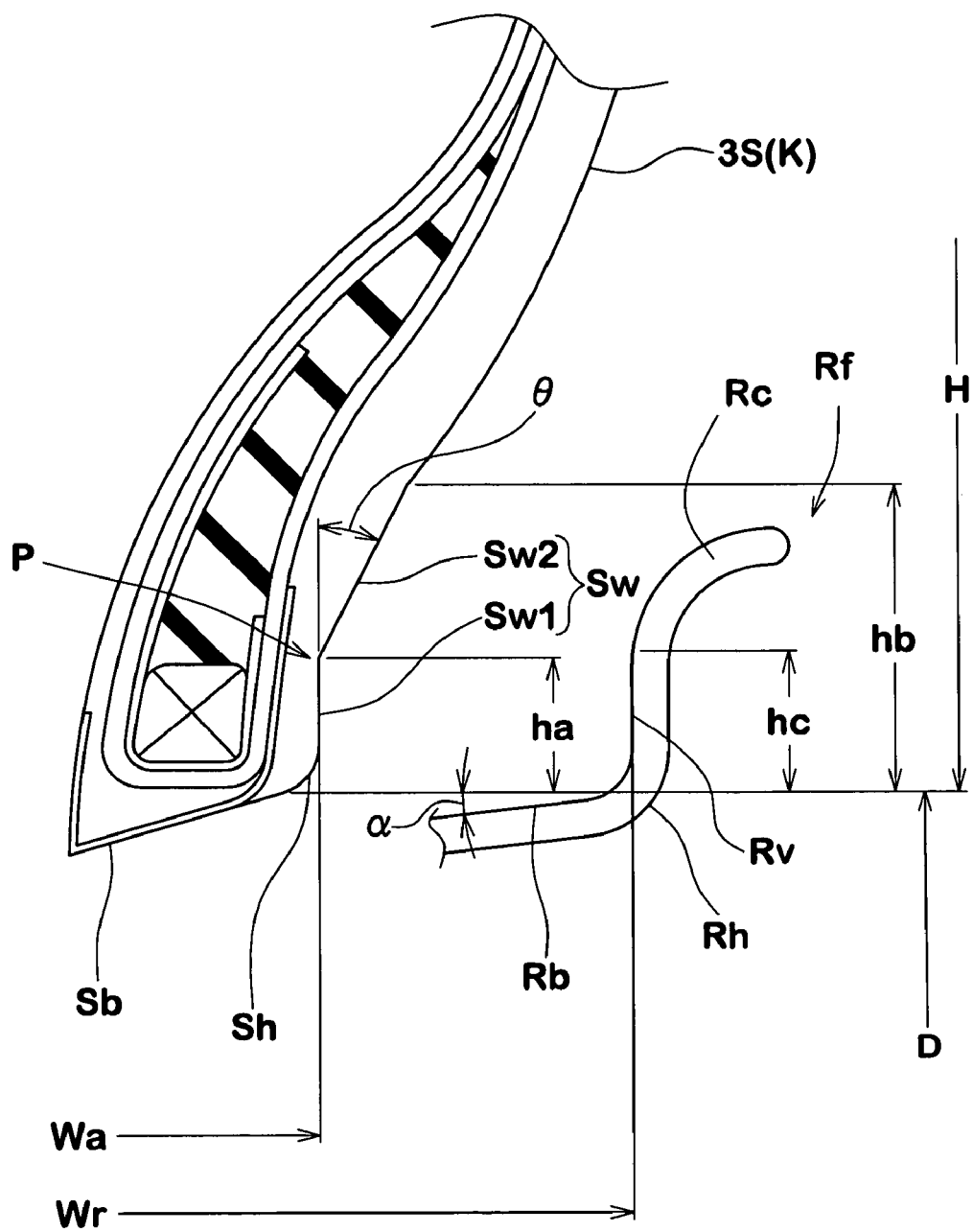
FIG. 2 is an enlarged cross sectional view showing the bead portion thereof and a rim flange.

In the example shown in FIGS. 1 and 2, the radially outer part Sw2 is merged into the outer surface 3S of the sidewall portion 3 which surface extends on a circular arc (K) having the center on an axial straight line passing the maximum cross sectional width point M.

Figure 3:
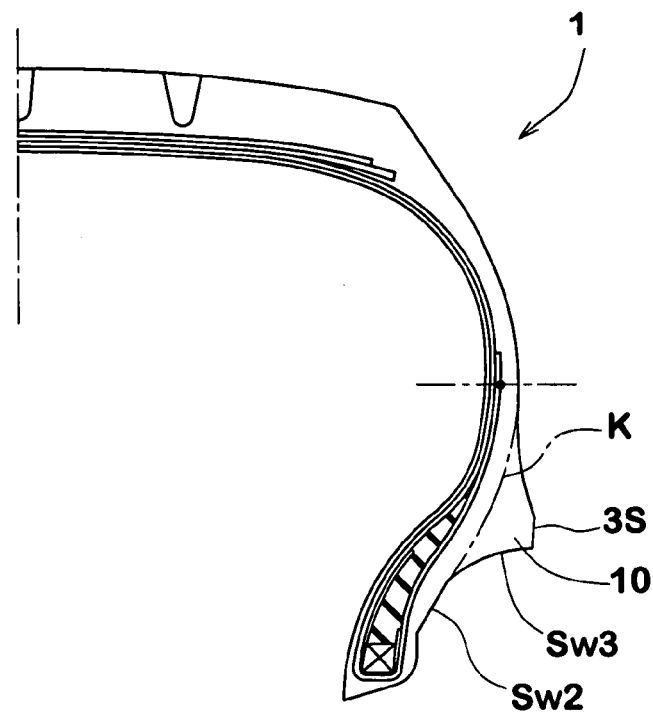
FIGS. 3 and 4 are cross sectional views each showing a partial modification of the tire shown in FIG. 1 wherein a rim protector is provided in the lower sidewall portion.
Figure 4:
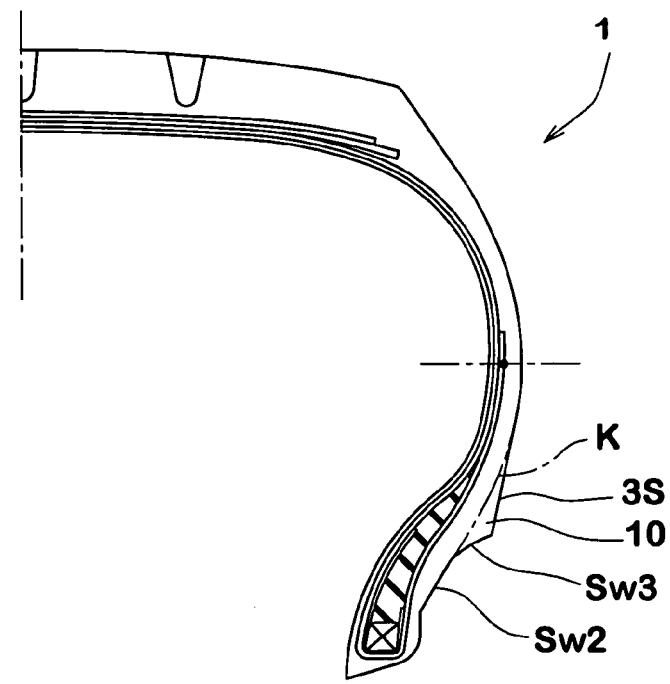
Figure 5:
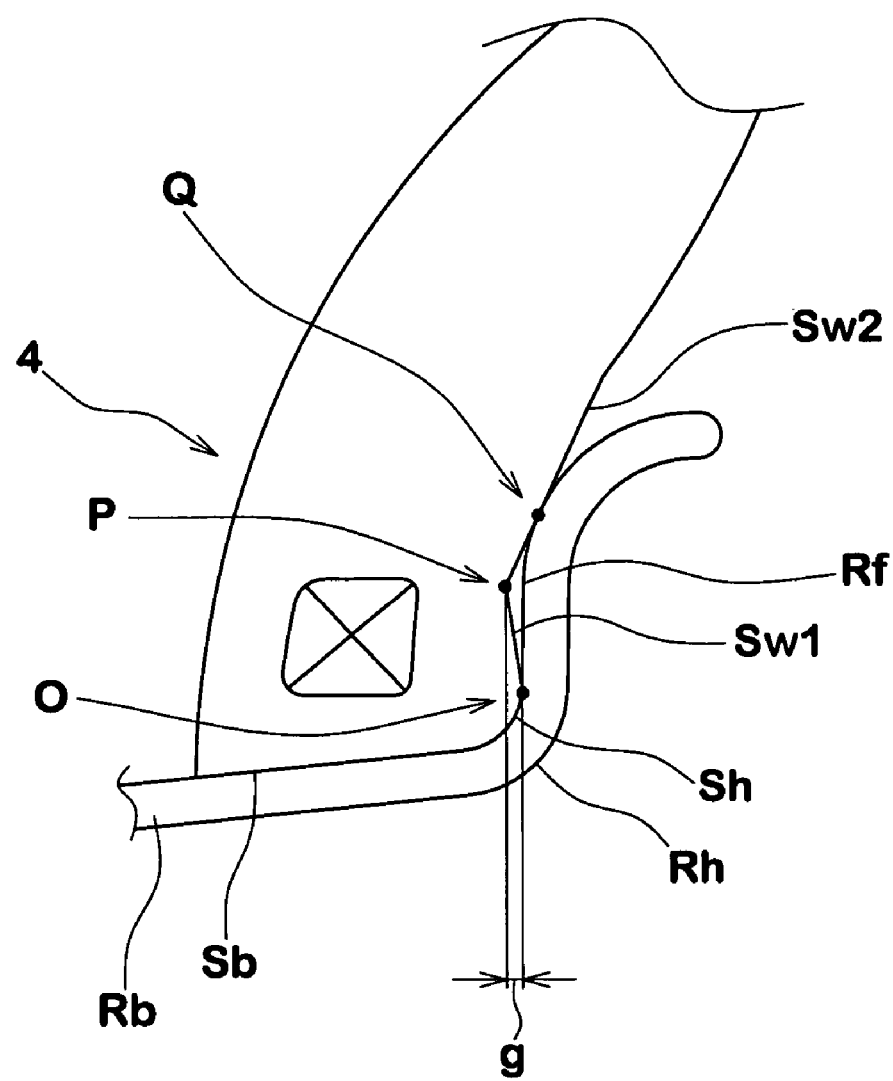
FIG. 5 is a schematic cross sectional view showing a contact between the bead portion and rim flange where a gap therebetween is exaggeratedly illustrated.
Figure 8:
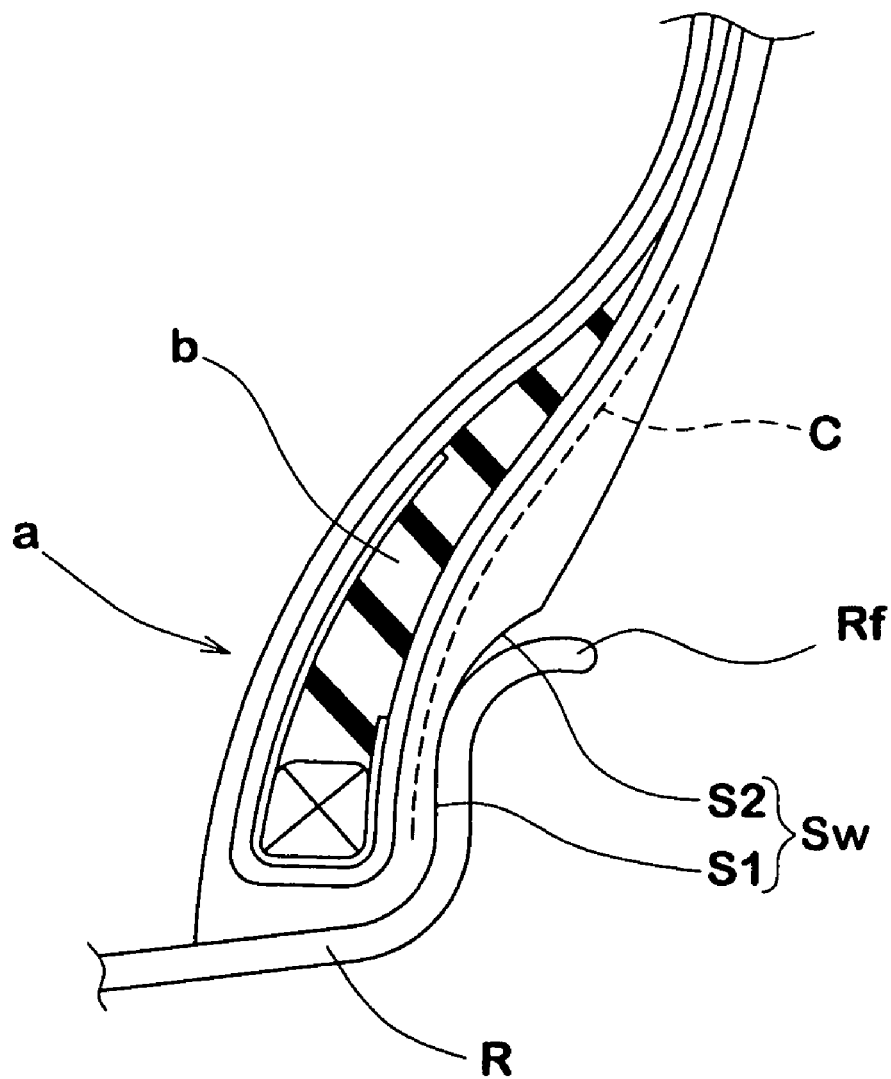
FIG. 8 is a schematic cross sectional view showing conventional rim flange contact.

FIGS. 3 and 4 show partial modifications of the tire 1 wherein the sidewall portion 3 is provided in the lower portion with a rim protector 10 which protrudes axially outwardly from the above-mentioned circular arc (K) to overhang the rim flange Rf and has a generally triangular cross sectional shape (FIG. 4) or generally trapezoidal cross sectional shape (FIG. 5). The underside Sw3 of the rim protector 10 is formed by a slightly curved concave line which extends axially outwards from the radially outer edge of the above-mentioned radially outer part Sw2. In both of the examples shown in FIGS. 3 and 4, the underside Sw3 intersects the radially outer part Sw2 at an obtuse angle less than 180 degrees.

If the above-mentioned height ha of the inner end is more than 0.25 times the height H of the maximum cross sectional width point M, and/or the height hb of the outer end is less than 0.35 times the height H, and/or the above-mentioned angle theta is less than 10 degrees, then it becomes difficult to improve the steering stability. If the height ha is less than 0.15 times the height H, and/or the angle theta is more than 20 degrees, then bead seating is liable to become unstable. If the height hb is more than 0.45 times the height H, then the steering stability is liable to deteriorate. Further, if the height hb is more than 0.6 times the height H, defective molding such as bareness of rubber on the tire outer surface, carcass deformation such as carcass line undulation and the like are liable to occur. It is thus preferable that the height ha is also limited in the range of from 0.15 to 0.25 times the height H, and the height hb is at most 0.6 times the height H, preferably in the range of from 0.35 to 0.45 times the height H.

The above-explained bead profile is intended to cause a tight contact between the radially outer part Sw2 of the tire bead portion and the radially outer curved portion Rc of the rim flange at least when the tire is subjected to a side force for example when turning the steering wheel or during cornering. As a result, the reactive force against the side force is increased, and the steering response and steering stability can be improved.

If very sharp response is sought, the height ha is set lower than the height hc. In this case, at the time when the tire is mounted on the rim and normally inflated, a tight contact is already caused although the conventional profile causes a tight contact when the tire is deflected more than a little. Thus, the steering response and steering stability can be improved not only during cornering but also during straight running. In this case, for the above-mentioned inclination angle theta, relatively small values for example 5 to 10 degrees are preferred.

If response somewhat milder than the above is sought, the height ha is set to be not lower than the height hc. In this case, at the time when the tire is mounted on the rim and normally inflated, a tight contact is almost not yet caused, but a tight contact is easily caused even by a small deflection due to side force. Thus, in this case too, the response can be improved in comparison with the conventional profile. In this case, contrary, relatively large values for example 10 to 20 degrees are preferred as the inclination angle theta.

Under severe heavy load conditions, as exaggeratedly shown in FIG. 5, if a gap (g) is formed between the tire bead and rim flange due to resultant loose contact in the middle height of the rim flange, it is out of the question as far as the maximal value thereof is less than 1.5 mm and a gap is only partial. If the maximal value which usually occurs at the inflexion point P or the intersecting point between the inner and outer parts Sw1 and Sw2 exceeds 1.5 mm, force variation during rolling is liable to increase due to unstable bead seating. Therefore, the gap (g) is preferably less than 1.0 mm at most.

Comparison Tests

Test tires of size 215/40R17 (rim size 7JJ×17) having the same structure shown in FIG. 1 except for the bead profile were made and tested for steering stability and ride comfort, using a two-seat 3200 cc midship-engine sports car provided on all the four wheels with test tires (tire pressure 230 kPa). The driving test was carried out on dry asphalt road in a tire test course, and the test driver evaluated steering stability (initial tire response, steering response and rigid feel) and ride comfort into ten ranks. The test results and specifications of the bead profile are shown in Table 1. The larger the rank number, the better the performance.

The invention claimed is:

1. A pneumatic tire comprising
   a tread portion,
   a pair of sidewall portions, and
   a pair of bead portions, each said bead portion having a bottom face and an axially outer side face which contact with a bead seat and a flange of a standard wheel rim, respectively, when the tire is mounted on the wheel rim,
   said flange having a radially inner flat portion substantially parallel with an equatorial plane of the tire and a radially outer curved portion extending radially outwards from the radially outer end of said radially inner flat portion while inclining axially outwards,
   said axially outer side face comprising a radially inner part for contacting with said radially inner flat portion of the rim flange, and a radially outer part for contacting with said radially outer curved portion of the rim flange, wherein
   said axially outer side face is provided with a profile such that, in a meridian section of the tire, when a bead width Wa of the tire is adjusted to a rim width Wr of the wheel rim without being mounted on the wheel rim, the radially inner part is a substantially straight line parallel with the equatorial plane of the tire, and the radially outer part is (A) a substantially straight line or (B) a convex line or (c) a concave line having a radius of curvature of not less than 300 mm, and
   the radially outer part extends radially outwards from the radially outer end of the radially inner part while inclining axially outwards, and
   a height ha of the boundary between the radially outer part and the radially inner part is in a range of from 0.6 to 1.2 times a height hc of the boundary between the radially outer curved portion and the radially inner flat portion of the rim flange.

2. The pneumatic tire according to claim 1, wherein the inclination angle (theta) of the radially outer part at the

TABLE 1

| Tie | Ref. 1 | Ref. 2 | Ref. 3 | Ex. 1 | Ex. 2 | Ex. 3 |
|---|---|---|---|---|---|---|
| Max. width height H (mm) | 42.2 | 42.2 | 42.2 | 42.2 | 42.2 | 42.2 |
| Radially outer part Sw2 | | | | | | |
| Profile | arc | arc | arc | straight | straight | straight |
| Radius of curvature (mm) | 10.5 | 20.5 | 50.5 | — | — | — |
| Angle theta (deg.) | 15 | 15 | 15 | 15 | 15 | 15 |
| Height ha (mm) | 10.5 | 10.5 | 10.5 | 10.5 | 10.5 | 10.5 |
| Height hb (mm) | 21 | 21 | 21 | 21 | 15 | 30 |
| Rim flange height (mm) | 18 | 18 | 18 | 18 | 18 | 18 |
| Height hc (mm) | 9 | 9 | 9 | 9 | 9 | 9 |
| Steering stability | | | | | | |
| Initial tire response | 6 | 6 | 6.5 | 8 | 7 | 7 |
| Steering response | 6 | 6 | 6 | 7 | 7 | 6.5 |
| Rigid feel | 6 | 6 | 6.5 | 8 | 8 | 7 |
| Ride comfort | 6 | 6 | 6 | 6 | 6 | 6 |

As describe above, in the pneumatic tire according to the present invention, by simply changing the bead profile, the steering stability can be unexpectedly and effectively improved while maintaining ride comfort without increasing rubber volume and providing additional reinforcing layer.

radially inner end thereof is in a range of from 10 to 20 degrees with respect to the tire equatorial plane.

3. The pneumatic tire according to claim 1, which further comprises a carcass extending between the bead portions, and wherein the height hb of the radially outer end of the radially outer part is in a range of 0.35 to 0.45 times the height H of the maximum section width position of the carcass under the normally inflated unloaded condition of the tire.

4. The pneumatic tire according to claim 1, wherein the height hb of the radially outer end of the radially outer part is more than the height of the rim flange.

5. The pneumatic tire according to claim 1, wherein the tire comprises a carcass extending between the bead portions, and the height ha of the radially inner end of the radially outer part is in a range of from 0.15 to 0.25 times the height H of the maximum section width position of the carcass under the normally inflated unloaded condition of the tire.

6. The pneumatic tire according to claim 1, wherein the height hc is 9 mm.

7. The pneumatic tire according to claim 1, wherein the tire aspect ratio is not more than 55%.

8. A combination of a wheel rim and a pneumatic tire mounted thereon, the pneumatic tire comprising
  a tread portion,
  a pair of sidewall portions and
  a pair of bead portions,
  the wheel rim comprising a pair of bead seats for the bead portions of the tire, and a flange extending radially outwardly from each said bead seat, the flange having a radially inner flat portion and a radially outer curved portion extending radially outwardly from the radially outer end of the radially inner flat portion,
  each said bead portion having a bottom face and an axially outer side face which contact with the bead seat and the flange, respectively, when the tire is mounted on the wheel rim, said axially outer side face comprising a radially inner part for contacting with the radially inner flat portion of the flange, and a radially outer part for contacting with the radially outer curved portion of the flange, wherein said axially outer side face of each said tire bead portion is provided with a profile such that, in a meridian section of the tire, when a bead width Wa of the tire is adjusted to a rim width Wr of the wheel rim without being mounted on the wheel rim, the radially inner part is a substantially straight line parallel with the equatorial plane of the tire, and the radially outer part is (A) a substantially straight line or (B) a convex line or (c) a concave line having a radius of curvature of not less than 300 mm, and the radially outer part extends radially outwards from the radially outer end of the radially inner part while inclining axially outwards, and
  a height of the boundary between the radially outer part and the radially inner part is in a range of from 0.6 to 1.2 times a height of the boundary between the radially outer curved portion and the radially inner flat portion of the rim flange.

9. The combination according to claim 8, wherein the inclination angle (theta) of the radially outer part at the radially inner end thereof is in a range of from 10 to 20 degrees with respect to the tire equatorial plane.

* * * * *